UNITED STATES PATENT OFFICE.

EDMUND BAUJARD, OF AUBERVILLIERS, FRANCE, ASSIGNOR TO JOHN W. MACKAY, OF VIRGINIA CITY, NEVADA.

TREATING WATERS CONTAINING GLYCERINE OBTAINED BY THE DECOMPOSITION OF FATTY MATTERS.

SPECIFICATION forming part of Letters Patent No. 280,893, dated July 10, 1883.

Application filed December 27, 1882. (No specimens.)

*To all whom it may concern:*

Be it known that I, EDMUND BAUJARD, of Aubervilliers, Seine, France, have invented a certain new and useful Improvement in the Treatment of Waters Containing Glycerine Obtained by the Decomposition of Fatty Bodies; and I do hereby declare that the following is a specification of the same.

The object of this improvement is to obtain a pure and sweet glycerine.

I will first describe the treatment of the waters obtained by the process of saponification.

The glycerinous waters are separated from the decomposed fatty bodies in the ordinary or any other suitable manner. The waters thus clarified contain glycerine, small quantities of fatty acid, coloring and azotized matters, and volatile organic acid salts of lime, besides traces of salts of copper and iron resulting from the action of these organic acids on the metal of the apparatus. These waters are turned into suitable evaporating apparatus, but preferably into one lined with lead or tin. The waters are evaporated rapidly by means of steam confined in a jacket or coil. During the evaporation a small quantity of white stearic acid is introduced. I begin by introducing a few kilograms for every thousand liters of glycerinous water. The stearic acid decomposes the volatile organic acid salts of lime with the aid of the heat. The volatile acids evolved are taken up by the vapor of water. The vapor disengaged by evaporation is very acid. When it ceases to be so, it is certain that the glycerine has become pure. The stearic acid, with the lime which is in suspension, forms stearate of lime. This stearate of lime is prevented from becoming infusible by the introduction of an excess of stearic acid, in order that it may be kept active. It is necessary, therefore, to add small quantities of the stearic acid in the course of the evaporation when it is perceived that the supernatant mixture of stearic acid and stearate of lime tends to solidify in spite of the heat. The salts of copper and of iron are meantime decomposed by the stearic acid. The stearate of lime formed carries away also almost all coloring and azotized matters. The evaporation is continued until the glycerine ranges at 22° to 24° Baumé or 15° centigrade. The evaporation is then stopped and the product allowed to cool slowly. The mixture of stearate of lime and of stearic acid in excess congeals upon the surface and a very clear glycerine is formed beneath.

The glycerine thus obtained is almost white and of good taste. It contains but the slightest traces of foreign matter. The stearic acid and the stearate of lime formed are strongly brown colored.

This mixture of stearic acid and stearate of lime may be used over again in stearine manufacture. The expense is then almost nothing. The glycerine obtained at 22° to 24° Baumé is concentrated to 28° or 30°, according to the density desired.

If it is desired to make glycerine for dynamite, it is evaporated to 30° Baumé, a quarter per thousand of pure animal charcoal is added, and it is filtered after evaporation. The charcoal contains the imperceptible traces of fatty acids which may have been in the glycerine.

If it is desired to make glycerine for edible purposes or pure white, it is only necessary to follow the practice known in glycerine-refineries—that is to say, the addition of a little more chemically-pure animal charcoal and to effect the precipitation of the traces of lime by the known reagents.

I will now describe the course pursued with waters obtained from the treatment by acidification.

The glycerinous waters contain glycerine, free sulphuric acid in large quantities, coloring-matters, volatile organic acids in the free state, and products of destruction and oxidation, such as acroleine and acrylic acid. I saturate, according to custom, with carbonate of lime or caustic lime, only these bodies are purified before they are used. I decant the clear and neutral waters and evaporate them with stearic acid exactly as described for the waters of saponification; but as they contain in solution notable quantities of sulphate of lime, it is necessary to add in proportion to the evaporation small quantites of the carbonate of baryta, free from soluble salts, and in fine powder. The stearic acid sets at liberty the volatile organic acids. The latter dissolve the baryta, forming with it the soluble salts of baryta, and the latter are immediately decomposed by the sulphate of lime into insoluble sulphate of baryta and volatile organic acid salts of lime, which finally are decomposed by the stearic acid. I may also employ stearate of baryta kept in fusion by an excess of stearic acid. In this manner the reaction is simply by double decomposition. It must be ascertained during the course of evaporation by means of a soluble salt of baryta whether there has been added enough of baryta. The evaporation is finished and the subsequent treatment of the glycerine is exactly as described for the glycerine of saponification. In lieu of stearic acid, other analogous acids may be used.

If the decoloration of the glycerine obtained by the treatment hereinbefore described is not sufficient, I add in the course of the evaporation a hydrogenous reducing-body, preferably powder of zinc, obtained by the distillation of metallic zinc. I obtain thus a perfect decoloration, and the oxide of zinc formed is absorbed and combined in the operation with the stearic acid and no trace of it remains in the glycerine. The proportion of zinc is very variable, ordinarily one per thousand of the glycerinous waters.

What I claim as my invention, and desire to secure by Letters Patent, is—

1. In the process of treating glycerinous waters, the introduction of stearic or analogous acid into them during evaporation, substantially as specified.

2. In the process of treating glycerinous waters obtained by acidification, the employment of carbonate or stearate of baryta, substantially as specified.

3. In the process of treating glycerinous waters, the employment of stearic or analogous acid and a hydrogeneous reducing-body, substantially as specified.

E. BAUJARD.

Witnesses:
H. DE CASTRO,
FRANK SAUNDERS.